United States Patent
Filmer et al.

(10) Patent No.: US 11,162,361 B2
(45) Date of Patent: Nov. 2, 2021

(54) METHOD FOR MINING AND PROCESSING OF AN ORE

(71) Applicant: ANGLO AMERICAN SERVICES (UK) LTD., London (GB)

(72) Inventors: Anthony Owen Filmer, Kangaroo Point (AU); Daniel John Alexander, London (GB)

(73) Assignee: ANGLO AMERICAN SERVICES (UK) LTD., London (GB)

( * ) Notice: Subject to any disclaimer, the term of this patent is extended or adjusted under 35 U.S.C. 154(b) by 181 days.

(21) Appl. No.: 16/023,435

(22) Filed: Jun. 29, 2018

(65) Prior Publication Data
US 2019/0143337 A1    May 16, 2019

(51) Int. Cl.
*E21C 41/30* (2006.01)
*E21C 47/00* (2006.01)
*E02F 7/10* (2006.01)
*E21F 13/06* (2006.01)
*E21C 35/20* (2006.01)
(Continued)

(52) U.S. Cl.
CPC .............. *E21C 41/30* (2013.01); *E02F 7/10* (2013.01); *E21C 47/00* (2013.01); *E21F 13/06* (2013.01); *B02C 21/02* (2013.01); *B02C 23/20* (2013.01); *B65G 53/30* (2013.01); *E02F 7/00* (2013.01); *E21C 35/20* (2013.01); *E21C 41/00* (2013.01); *E21F 13/00* (2013.01)

(58) Field of Classification Search
CPC ......... E21F 13/00; E21F 13/002; E21F 13/04; E21F 13/042; E21F 13/06; E21F 13/063; E21F 13/08; E21C 35/20; E21C 47/00; E21C 47/02; E21C 41/14; E21C 41/26; E21C 41/30; E02F 7/10; B02C 23/20

USPC .............................................. 299/18
See application file for complete search history.

(56) References Cited

U.S. PATENT DOCUMENTS 2,791,471 A * 5/1957 Clancey ................. B65G 53/30
406/197
3,260,548 A * 7/1966 Reichl ................... B65G 53/30
299/18

(Continued)

FOREIGN PATENT DOCUMENTS

WO    WO-2004-094056    11/2004
WO    WO-2008-005097     1/2008

OTHER PUBLICATIONS

Borg et al., "Improved Particle Liberation by High-Velocity Conuninution-the new VeRo Liberator®", 2015, pp. 5-14
(Continued)

*Primary Examiner* — Janine M Kreck
*Assistant Examiner* — Michael A Goodwin
(74) *Attorney, Agent, or Firm* — Nixon Peabody LLP; Jeffrey L. Costellia

(57) ABSTRACT

The invention relates to a method for mining and processing of an ore. The method comprises at least one mobile comminution device (26) comprising at least one mobile crusher unit and at least one mobile grinding unit located proximate to an ore body that is being mined (20), fragmented ore (22) from the ore body is comminuted in the mobile comminution device (26) to a size which can be readily pumped (28) without the use of special carrier fluids, preferably to a particle size p50 in the range between 0.05 to 1 mm and the comminuted ore is combined with water to form a slurry.

22 Claims, 1 Drawing Sheet

(51) Int. Cl.
*B65G 53/30* (2006.01)
*B02C 23/20* (2006.01)
*E02F 7/00* (2006.01)
*E21C 41/00* (2006.01)
*B02C 21/02* (2006.01)
*E21F 13/00* (2006.01)

(56) References Cited

U.S. PATENT DOCUMENTS

| | | | | |
|---|---|---|---|---|
| 4,265,737 A | * | 5/1981 | Smith | B01D 11/028 |
| | | | | 209/11 |
| 2003/0038526 A1 | * | 2/2003 | Drake | E21B 7/002 |
| | | | | 299/18 |
| 2003/0173818 A1 | * | 9/2003 | Trevis | E21D 9/13 |
| | | | | 299/18 |
| 2006/0289685 A1 | * | 12/2006 | Graham | B02C 19/06 |
| | | | | 241/39 |
| 2007/0176032 A1 | * | 8/2007 | Russel-Smith | B01J 2/10 |
| | | | | 241/199.12 |
| 2007/0180741 A1 | * | 8/2007 | Bjornson | B03B 9/02 |
| | | | | 37/403 |
| 2009/0008297 A1 | * | 1/2009 | Cleminson | C10L 1/326 |
| | | | | 208/391 |
| 2011/0175429 A1 | * | 7/2011 | Amos | E21C 47/00 |
| | | | | 299/18 |
| 2013/0051933 A1 | | 2/2013 | Painter | |
| 2013/0075506 A1 | * | 3/2013 | Bjornson | B03B 9/02 |
| | | | | 241/43 |
| 2016/0228879 A1 | | 8/2016 | Scharfe | |
| 2016/0310956 A1 | * | 10/2016 | Filmer | C22B 23/005 |

OTHER PUBLICATIONS

Berg et al., "Hydraulic Hoisting Technology for Platinum Mines", International Platinum Conference, 'Platinum Adding Value', The South African Institute of Mining and Metallurgy, 2004, pp. 15-24.
International Preliminary Report for PCT/IB2018/054844, dated May 3, 2019.

* cited by examiner

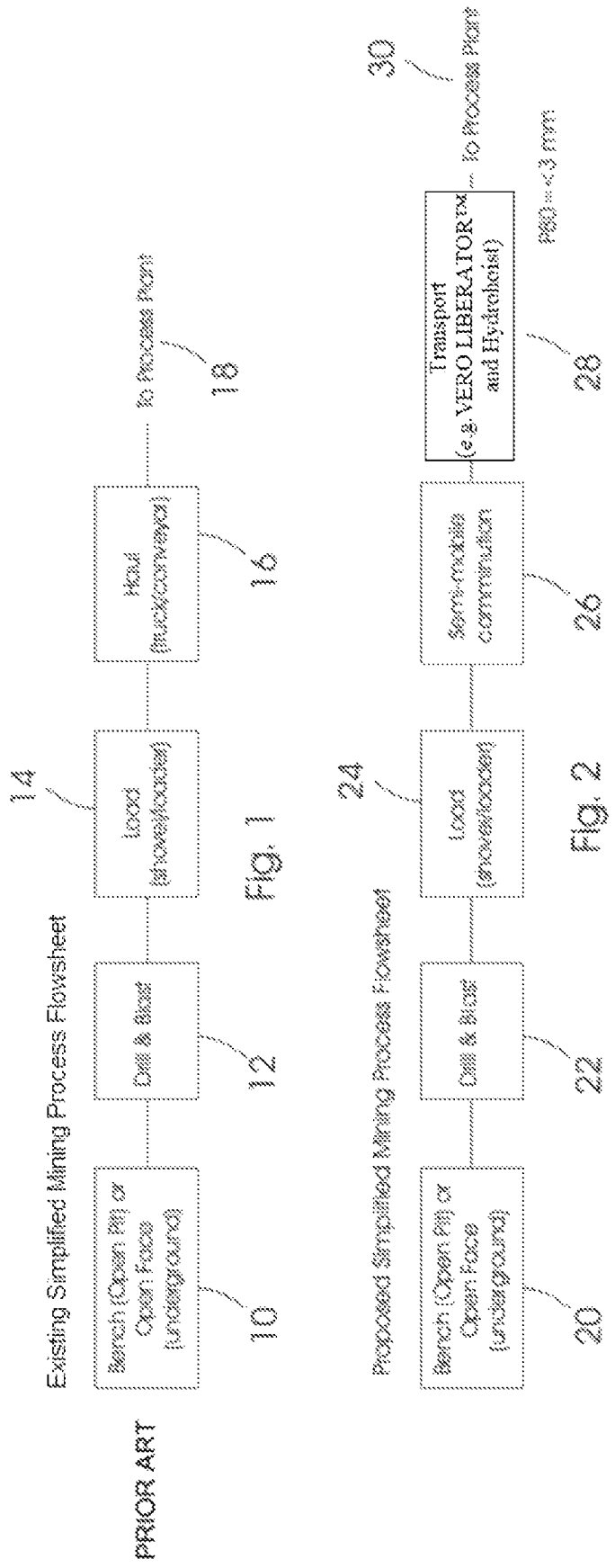

METHOD FOR MINING AND PROCESSING OF AN ORE

BACKGROUND TO THE INVENTION

THIS invention relates to an improved method for mining and processing of an ore.

The costs associated with mining largely relate to the logistics of moving large quantities of ore and waste, and also the comminution to liberate the valuable elements from the surrounding gangue, thus enabling the beneficiation of the ore to produce a concentrate suitable for further smelting or leaching.

Mining, both underground and open pit, is carried out through drilling and blasting or rock cutting, then excavation and transportation of the broken rock with purpose built equipment such as trucks or conveyers or in skips up a shaft. The processing is carried out in fixed plant located nearby to the mine, the first steps of which are comminution to liberate the valuable component of the ore from the associated gangue. As most of the milling and beneficiation processes are undertaken in a slurry form, the processing consumes substantive quantities of water, and produces a beneficiation tailings which cannot be readily dewatered.

The mining industry has matured in a paradigm where the primary technological improvement has been to increase scale of operation (e.g. truck and mill capacity). Substantive energy is consumed, both in the form of fuel to transport the rock, and as electrical power to mill the solids. Neither process is particularly energy efficient.

The design of the mine, the slope of the pit shell slopes and benches, or the development to access an underground mine face, is constrained by the requirement for rock transportation. Transportation methods include trucks, trains, and various forms of conveyors. Whilst in-pit or underground conveying is inherently attractive, such techniques are usually constrained relative to mobile haulage because the conveyors, and their associated foundations, are expensive, and have quite limited flexibility in terms of inclines and corners.

Most open pit mines are designed for heavy haulage machinery to access the mine on a frequent basis, thus requiring benches (roads) of a width suitable for passing traffic, with appropriate safety factors. This puts constraints on the achievable wall slopes that are greater than those required by the natural rock stability. Thus in an open pit mine, the excavation of the pit will be more related to haulage needs than the shape of the orebody. The consequential amount of waste hauled relative to the ore, the strip ratio, will be increased accordingly.

Underground mines usually use loaders and trucks or trains for transportation, either directly out a decline, or to the base of a shaft. In either case, the dimensions and slopes of much of the development required, and subsequent ventilation are the direct consequence of these underground transportation mechanisms. Where conveyors are used, the slope and bend restrictions dictate the development. Thus development volumes are considerably greater than that required to simply access the ore.

Various authors have previously proposed in-situ grinding and pumping of ore, particularly for vertical transport from underground mines. An example is van den Berg, G and Cooke, R. Hydraulic hoisting technology for platinum mines. International Platinum Conference 'Platinum Adding Value', The South African Institute of Mining and Metallurgy, 2004 (www.saimm.co.za/Conferences/Pt2004/015_vandenBerq.pdf). However, this technology has not gained traction due to the requirement for expensive pumping equipment to support the large particle size of crushed ore, or fixed grinding equipment such as ball mills which require significant foundations, and as such are not able to be relocated as the mine face moves.

Other authors have proposed mobile crushing to a particle size which requires special carrier fluids or very high pumping velocities to prevent the large particles from settling and blocking the pipes, particularly where flows are largely in a horizontal plane (US 2013/0051933). The special carrier fluids are essential to enable suspension of these coarser particles during transport, as the envisaged crushers do not produce a particle size suitable for direct pumping of the ore.

Despite the various efforts in technology development the industry has retained its traditional structure of drill, blast, load, haul, crush, grind, beneficiate. FIG. 1 shows a typical prior art process flow sheet, in which the ore in Bench (open Pit) or Open Face (underground) mines 10 is drilled and blasted 12 to a particle size P80 of 400 mm. The blasted ore is loaded 14 for example with a shovel or loader, and hauled with a truck or conveyor 15 to a process facility 18.

The object of this invention is to address the above problems.

SUMMARY OF THE INVENTION

According to the invention there is provided a method for mining and processing of an ore, wherein:
  at least one mobile comminution device comprising at least one mobile crusher unit and at least one mobile grinding unit, is located proximate to an ore body that is being mined;
  fragmented ore from the ore body is comminuted in the mobile comminution device to a size which can be readily pumped without the use of special carrier fluids, preferably to a particle size p50 in the range between 0.05 to 1 mm; preferably between 0.1 to 0.8 mm, more preferably between 0.2 to 0.5 mm; and
  comminuted ore is combined with water to form a slurry.

The ore body may be an open face in an underground mine, or an excavation surface in an open pit mine.

By "mobile" is meant that the comminution device does not require extensive foundation and may be moved with a progressing open face or excavation surface of an ore body.

By "proximate" in the case of an underground mine means spacing between direct loading to 200 m from the open face, and in the case of an open pit mine means spacing between direct loading to 500 m from an excavation surface.

Typically, the method will include the following steps:
  fragmentation of rock from an open face or an excavation surface;
  loading haulage of fragmented rock to the comminution device;
  comminution of the ore in the comminution device;
  combining the comminuted ore with water to form a pumpable slurry; and
  pumping the slurry to a processing facility.

The mobile crusher unit reduces the size of the fragmented ore by using an impact method, attrition method, shear method, compression method or a combination thereof, preferably to a size between 100 to 400 mm, more preferably to a size between 100 to 300 mm; more preferably between 150 to 250 mm, and more preferably about 200 mm.

The mobile grinding unit reduces the particle size received from the mobile crusher unit to a fine particle size p50 of between 0.05 to 1 mm.

The mobile-grinding unit is preferably VERO LIBERATOR™, EDS™, PULVERDRYER™, or DEVOURX™.

The slurry may be pumped from at least one mobile comminution device to a sump where it is thickened to form a pumpable slurry suitable for transport from the mine using a suitable pumping device. This slurry typically has a density of 40 to 75% by weight solids.

Preferably, the fragmented ore is at a particle size of p80 about 200 mm or less, preferably about 100 mm or less.

Fragmentation may be achieved by fragmentation in blasting, rock cutting, boring machines, or by crushing blasted ore in a mobile crushing unit.

In accordance with the method of the present invention, the comminution device and fragmentation are moved intermittently with the advancement of the direct loading from the open face or the excavation surface.

Optionally, the slurry may be treated in a pre-beneficiation process such as coarse flotation, gravity separation or screening, before being pumped to the processing facility or storage area, to allow a reduced cut-off-grade of ore to be mined, or higher grade ore to be sent to the processing facility or storage area.

A waste fraction from mining and/or pre-beneficiation may be stacked as a free draining heap, allowing water recovery.

Waste from mining and/or the pre-beneficiation process may be pumped and deposited as backfill to a mine.

The water used for slurrying the comminuted rock may be selected from groundwater influx which occurs naturally and removed for the purposes of mining, return water from processing facilities or pre-beneficiation process, make up water, or a combination thereof.

BRIEF DESCRIPTION OF THE DRAWINGS

FIG. 1 is a schematic overview of a prior art process.

FIG. 2 is a schematic overview of a process of the invention.

DETAILED DESCRIPTION OF THE INVENTION

Broadly speaking, the present invention uses a multiplicity of mobile comminution systems located close to the working mine-face, to minimise transportation distance from the ore loading process to the mobile comminution system.

Throughput capacities demanded by a large scale mine may be achieved by an improved fragmentation in blasting, to yield blasted rock that is of sizes more traditionally associated with the product of primary and secondary crushing (e.g. p80 less than 20 cm). Alternatively, rock can be fragmented using various rock cutting or boring machines. This improved fragmentation has been complemented by mobile crushing units such as mineral sizers, which can reduce any oversize from fragmentation.

Recently, there have been developments of an alternative type of grinding machine, of which VERO LIBERATOR™ (described in US2016228879, the content of which is incorporated herein by reference), PULVERDRYER™ (described in WO2008005097, the content of which is incorporated herein by reference), EDS™ (described in WO2004094056, the content of which is incorporated herein by reference), and DEVOURX™ are examples. These grinding machines, whilst not yet commercialised or fully understood technically, appear to rely on shock breakage.

They typically operate dry, and grind materials to similar grind sizes as a conventional ball mill. The proponents of these machines claim improved dry grinding, energy efficiency and improved liberation of mineral grains, as their benefits.

One characteristic of these grinding machines is the minimal foundations that they require, thus offering the potential to create semi-mobile (i.e. a machine on skids that can be moved every say month or two), or even fully mobile (i.e. a machine on tracks that can move with the loading process). For the purposes of this patent description, the terminology mobile and semi-mobile will be used interchangeably.

The current invention incorporates alternative grinding technologies which unlike conventional rotating mills, do not require extensive foundations. They also exhibit low energy requirements and achieve large size reduction ratios (>50 times smaller than feed) reducing the need for recirculation and classification to produce a particle size distribution suitable for pumping. As such, they have the potential to be used in a mobile capacity. Some such examples of these alternative grinding technologies are the VERO LIBERATOR™, PULVERDRYER™, EDS™, and DEVOURX™.

With reference to FIG. 2 and in accordance with an embodiment of the invention, ore from a Bench (Open Pit) or Open Face (underground) mine 20 is drilled and blasted 22 to increase fragmentation. The drilled and blasted ore is delivered to a mobile comminution unit 26, either by direct loading from the shovel or conveyors 24, or through trucking to the mobile comminution unit 26. The mobile comminution unit 26 typically comprises of a mobile crushing unit and a mobile grinding unit. The ores (rocks) are comminuted at this mobile grinding unit to a size which is amenable to slurry pumping without the use of specially designed non-Newtonian carrier fluids. This size is a p50 of typically between 0.05 and 1 mm, and the slurrying of the ore minimizes issues associated with dust management. At this particle size, pumping takes place from the mobile comminution typically to a central pumping sump, from where it is pumped with purpose designed pumps with sufficient head to transport the slurry by pipe 28 from the mine and to a process plant 30.

As the mine-face moves, the comminution system can be relocated closer to the mine face, and the slurry transportation pipes between the multiplicity of grinding units and the central sump are readily extended, thus the transport system can evolve with the changing mine locations.

Through suitable design of the pumping systems, there are no restrictions on slopes or bends between the mine-face and the sump, nor between the sump and the processing plant. This provides considerable flexibility for the mine design, which is currently spatially constrained by the need for hauling with heavy mobile equipment, or fixed and almost linear conveying of material out from the mine.

The diameter of the piping for transportation is much smaller than that required for mobile equipment or even conveyors, thus size of access roads, shafts, declines or drifts can be greatly reduced. The only need for vehicles is access to the mine face, not routine transport of ore, thus reducing the need for two way access roads. Piping can be arranged through any slope or bend, so that constraints in the mine design are relived. The slope is no longer constrained by that required for trucking.

And the diameter of bends is no longer constrained by turning circles of loaded equipment. The quantity of passing traffic is minimal, and hence the need for clearance widths is much reduced.

This greater flexibility in mine design, in turn, reduces the amount of waste rock which must be excavated to access the ore, and opens up areas of the orebody which previously have been uneconomic to access.

The slurry is transported at high pulp density, with energy inefficiencies in transportation restricted to friction and the modest quantity of water that is transported with the ore. The energy that is consumed in conventional transportation for moving the container for the rock (e.g. conveyor belt or truck-body), rock is eliminated.

Additionally, environmental impacts such as dusting or spillage that are associated with trucking and conveying are minimised.

The relocation of grinding from the traditional location at the plant, implies that most of the product is at a size which can form a direct feed to the next stage of processing, particularly where the slurry is being fed to a pre-beneficiation process such as coarse particle flotation, gravity separation or screening. Even if finer grinding is ultimately required to achieve the desired recoveries or grade, the traditional SAG mill and much of the ball mill capacity located at the plant will be reduced. Thus, the energy required for the mobile comminution devices as offset by reductions in processing energy.

If the mine also requires transportation of a moderate quantity of waste (sub-cut-off-grade), this can be achieved using the same system. Only when extensive pushbacks are required, is the bulk materials handling appropriate.

If there is a pre-beneficiation to eliminate gangue, the product size from the grinding units can be set to produce a pre-beneficiation residue that can be stacked and drained, thus recycling most of the water, and not producing excessive tailings. This enables a lower cut-off-grade in the mine, thus enhancing the ratio of ore to waste achieved through the mobile grinding and pumping.

In summary, the invention enables the mine to be designed around the shape of the orebody, rather than designed around the transportation of rock.

Open Pit Case

The invention combines several technologies in a way which enables greater design flexibility and resource utilisation efficiency in mine and mineral processing design.

The first of these is a mobile comminution system, to convert rocks into a pumpable slurry. This is achieved through integration of technologies, where the set points for each comminution step are set to meet the specifications of the feed to subsequent steps. Fragmentation is carried out to ensure the feed to the mobile crushers contains a minimal amount of oversize rock for the crusher. This is typically around 750 mm and preferably smaller, to enhance the mobility of the mobile crusher. An example of a suitable mobile crushing device is manufactured by Mining Machinery Developments (MMD).

The product of the crushing must be suitable to feed a mobile grinding unit. An example of a suitable grinding device is the VERO LIBERATOR™. Maximum feed sizes to such a device are typically around 200 mm, and preferably smaller. The VERO LIBERATOR™, as described in Borg, Gregor & Scharfe, Felix & Kamradt, Andreas. (2015). Improved Particle Liberation by High-Velocity Comminution—the new VERO LIBERATOR®. Cuprum-Czasopismo Naukowo-Techniczne Gornictwa Rud. 75.5-14, is a device that operates as a dry grinding machine. This device can be simplified by replacing the dust filter with a wet scrubber, to directly produce a slurry suitable for pumping.

Depending on issues of space, the mine can be designed to either load directly from the shovel to the comminution system, or to employ a set of shuttle trucks to transport material between the mine face and the comminution system.

From the outlet of the mobile grinding, the slurry is then pumped to a holding sump. As the mobile comminution system moves with the advance of the mine, additional piping is installed to connect the comminution system to a centralised sump. At the centralised sump the ground material can be thickened to the optimum density for pumping out of the mine to the processing plant. The pumps required for this purpose are well known to those skilled in the art.

The energy required by the VERO LIBERATOR™ to reduce rock to pumpable size is <5 kwh/t (reference). At this power consumption, ore that is below current CoG can be processed, particularly if the new transportation design is used in conjunction with coarse gangue rejection technologies such as course flotation.

For any waste material that is still below the revised ore CoG, it can either be comminuted and pumped to tailings, or transported by conventional means.

The very low grade overburden required to access the ore (pre-stripping) may be removed through conventional load and haul techniques. But the combination of energy efficient grinding, low cost transportation and early coarse gangue rejection, implies that virtually all the material in massive orebodies such as porphyry copper deposits, can be processed as ore.

Given the flexibility of pumping over extended distances, it is possible to locate the processing plant at another more suitable location than immediately adjacent to the mine.

The routing of the pumping system will be selected to optimise mine design, and can be either along a roadway or directly up the pit walls. In an open pit mine, the pit wall angles can be steepened to the limit of rock integrity. The width of benches can be reduced to a sufficient width to enable occasional mobile equipment access, rather than continuous haulage. For steeply dipping orebodies, this has a substantial impact on the amount of pre-strip required (the mine strip ratio).

Underground Case

In underground case, the mobile crushing and grinding is located close to the working face. Rock is trammed or conveyed a short distance to the comminution system, from where the comminuted rock can be slurried and pumped to a central sump, for thickening and then hydro-hoisted from the mine.

Where adequate natural water is not present in the mine, water can be transferred from the surface for the purpose of slurrying, and returned to the surface in the form of the slurry.

The low energy of grinding achieved with the VERO LIBERATOR™, combined with the potential to reject gangue using beneficiation techniques such as coarse flotation, mean that both waste rock and ore can be transported in common infrastructure.

The ability to pump the ground rock from the mine also has substantial impact on the development required to access the ore. The need for rock haulage to surface out of a decline or up a shaft is eliminated. Rather the rock (both ore and waste) can be slurried and pumped out, either vertically through a raise bore, or following the existing development route.

Without the requirement for development dimensions to support routine tramming or conveying of ore and waste rock either to the surface via declines, or to a central shaft, sharing the same access route as other traffic users, many aspects of underground mine design can be enhanced. Steeper development can be utilised without the constraint for uphill haulage. Narrower development is possible, due to the much reduced traffic volume, with the size of access ways limited to that required for single vehicle access, with occasional passing bays.

The ventilation requirements are also reduced with a lower volume of air to be moved, due to reduced traffic movements and dust generation.

If backfill is required in the underground mine, the mobile grinding device can be used to grind waste and generate the backfill underground, and pump it to the area to be filled. Indeed, in many mine designs, much of the ongoing development waste can be placed in mined out stopes rather than having to be taken to surface.

Using the method of the present invention:

Mine design may be adapted as a consequence of the slurry transportation routing rather than requirements for trucking or conveying. This enables an improved proportion of ore to waste.

The diameter of haulage tunnels may be decreased, and the road incline angles are increased beyond that achievable with conventional transportation methods.

Reduced requirements for open pit ore transport allowing the slope angles on the pit to be increased.

The invention claimed is:

1. A method for mining and processing of a rock ore, comprising the steps of:
    positioning at least one mobile comminution device comprising at least one mobile crusher unit and at least one mobile grinding unit, proximate to an ore body that is being mined and wherein the at least one mobile crusher unit and at least one mobile grinding unit are moved intermittently with advancement of the ore body that is being mined;
    comminuting fragmented ore in the at least one mobile crushing unit to a size in the range between 100 to 400 mm, and grinding crushed ore from the crushing unit in the at least one mobile grinding unit to a particle size p50 in the range between 0.05 to 1 mm; and
    forming a pumpable slurry of the comminuted ore by combining the comminuted ore with water in the absence of additional non-Newtonian carrier fluids; and
    pumping the slurry slurring in a pipe to a processing facility.

2. The method as claimed in claim 1, wherein the particle size p50 of the comminuted ore is in the range between 0.1 to 0.8 mm.

3. The method as claimed in claim 2, wherein the particle size p50 of the comminuted ore is in the range between 0.2 to 0.5 mm.

4. The method as claimed in claim 1, wherein the ore body is an open face in an underground mine, or an excavation surface in an open pit mine.

5. The method as claimed in claim 1, wherein the mobile comminution device is located in an underground mine from direct loading to 200 m from an open face, or in an open pit mine from direct loading to 500 m from an excavation surface.

6. The method as claimed in claim 1, further comprising:
    fragmentation of rock from an open face or an excavation surface;
    loading fragmented rock to the comminution device; and
    comminution of the ore in the comminution device.

7. The method as claimed in claim 6, wherein the fragmentation is achieved by fragmentation in blasting, rock cutting, boring machines, or by crushing blasted ore in a mobile crushing unit.

8. The method as claimed in claim 6, wherein the comminution device and fragmentation are moved with advancement of a direct loading from the open face or the excavation surface.

9. The method as claimed in claim 1, wherein the mobile crusher unit reduces the size of the fragmented ore by using an impact method, attrition method, shear method, compression method or a combination thereof.

10. The method as claimed in claim 1, wherein the mobile crusher unit reduces the fragmented ore to a size in the range between 100 to 300 mm.

11. The method as claimed in claim 10, wherein the mobile crusher unit reduces the fragmented ore to a size in the range between 150 to 250 mm.

12. The method as claimed in claim 11, wherein the mobile crusher unit reduces the fragmented ore to a size about 200 mm.

13. The method as claimed in claim 1, wherein the slurry is pumped from the at least one mobile comminution device to a sump where it is thickened to form the pumpable slurry.

14. The method as claimed in claim 13, wherein the pumpable slurry has a density of 40 to 75% by weight solids.

15. The method as claimed in claim 14, wherein the fragmented ore is at a particle size p80 of about 100 mm or less.

16. The method as claimed in claim 1, wherein the fragmented ore is at a particle size p80 of about 200 mm or less.

17. The method as claimed in claim 1, wherein the slurry is treated in a pre-beneficiation process, before being pumped to the processing facility or storage area.

18. The method as claimed in claim 17, wherein the pre-beneficiation process is a coarse flotation, gravity separation or screening.

19. The method as claimed in claim 1, wherein waste fraction from mining and/or pre-beneficiation process is stacked as a free draining heap, allowing water recovery.

20. The method as claimed in claim 1, wherein waste from mining and/or pre-beneficiation process is pumped and deposited as backfill to a mine.

21. The method as claimed in claim 1, wherein the water used for slurrying is groundwater influx which occurs naturally, return water from processing facilities or pre-beneficiation process, make-up water or a combination thereof.

22. A method for mining and processing of a rock ore, comprising the steps of:
    positioning at least one mobile comminution device comprising at least one mobile crusher unit and at least one mobile grinding unit, proximate to an ore body that is being mined and wherein the at least one mobile crusher unit and at least one mobile grinding unit are moved intermittently with advancement of the ore body that is being mined;
    comminuting fragmented ore in the at least one mobile crushing unit to a size in the range between 100 to 400 mm, and grinding crushed ore from the crushing unit in the at least one mobile grinding unit to a particle size p50 in the range between 0.05 to 1 mm; and
    forming a pumpable slurry of the comminuted ore by combining the comminuted ore with water in the absence of additional non-Newtonian carrier fluids; and
    pumping the slurry to a processing facility, wherein the pumpable slurry has a density of 40 to 75% by weight solids.

* * * * *